(12) United States Patent
Morgan (10) Patent No.: US 6,562,909 B2
(45) Date of Patent: May 13, 2003

(54) GOLF BALL WITH MULTI-LAYER COVER

(75) Inventor: William E. Morgan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 26 days.

(21) Appl. No.: 09/883,423

(22) Filed: Jun. 18, 2001

(65) Prior Publication Data

US 2002/0013184 A1 Jan. 31, 2002

Related U.S. Application Data (60) Continuation-in-part of application No. 09/775,793, filed on Feb. 5, 2001, which is a continuation-in-part of application No. 09/625,544, filed on Jul. 25, 2000, which is a continuation of application No. 09/207,690, filed on Dec. 9, 1998, now Pat. No. 6,132,324, which is a division of application No. 08/863,788, filed on May 27, 1997, now Pat. No. 5,885,172.

(51) Int. Cl.$^7$ .............................. A63B 37/12; C08L 9/00
(52) U.S. Cl. ...................... 525/237; 525/236; 473/365; 473/373; 473/374
(58) Field of Search ................................. 473/365, 373, 473/374; 525/236, 237

(56) References Cited

U.S. PATENT DOCUMENTS 5,993,968 A * 11/1999 Umezawa et al.
6,113,505 A *  9/2000 Boehm
6,117,024 A *  9/2000 Dewanjee

* cited by examiner

Primary Examiner—David J. Buttner
(74) Attorney, Agent, or Firm—William B. Lacy (57) ABSTRACT

The invention relates to a golf ball having a core and two or more cover layers. The outer cover layer includes a thin castable material and the inner cover layer a polyisoprene based material.

18 Claims, 1 Drawing Sheet

FIG. 1

GOLF BALL WITH MULTI-LAYER COVER

CROSS-REFERENCE TO RELATED APPLICATIONS

This application is a continuation-in-part of application No. 09/775,793, filed Feb. 5, 2001, which is a continuation-in-part of application No. 09/625,544, filed Jul. 25, 2000, which is a continuation of application No. 09/207,690, filed Dec. 9, 1998, now U.S. Pat. No. 6,132,324, which is a divisional of application No. 08/863,788, filed May 27, 1997, now U.S. Pat. No. 5,885,172, the disclosures of which are all hereby incorporated by express reference thereto.

FIELD OF THE INVENTION

This invention relates generally to golf balls, having at least a center, and a multi-layer cover. The inner cover can comprise polyisoprene, the outer cover can be formed of a polymer blend including a polyurethane composition and the core can include a polybutadiene composition.

BACKGROUND OF THE INVENTION

Conventional golf balls can be divided into two general groups: solid balls or wound balls. The difference in play characteristics resulting from these different types of construction can be quite significant. Balls having a solid construction are popular with golfers because they provide a very durable ball while also providing maximum distance. Solid balls are generally made with a solid core, usually made of a cross linked rubber, enclosed by a cover material. Typically the solid core is made of polybutadiene which is chemically crosslinked with zinc diacrylate and/or similar crosslinking agents. In addition to one-piece solid cores, solid cores may also contain a number of outer layers, such as in a dual core golf ball. The cover is generally an ionomeric material, such as SURLYN®, which is a tradename for a family of ionomer resins produced by E. I. DuPont de Nemours & Co. of Wilmington, Del. Covers are typically a single layer but may also include one or more layers, such as in a double cover having an inner and outer cover layer.

The combination of the solid core and ionomeric cover materials provide a ball that is very durable and abrasion resistant. Further, such a combination tends to impart a high initial velocity to the ball, which results in increased distance. Because these materials are very rigid, however, solid balls can have a hard "feel" when struck with a club. Likewise, due to their construction, these balls tend to have a relatively low spin rate, which can provide greater distance and increases accuracy off the tee.

Wound balls typically have either a spherical solid rubber or liquid center, around which many yards of a tensioned elastomeric thread are wound. The wound core is then covered with a durable cover material, such as SURLYN® or similar material, or a softer cover material, such as polyurethane. Wound balls are generally softer and provide more spin, which enable a skilled golfer to have control over the ball's flight and landing position. Particularly, with approach shots onto the green, the high spin rate of soft, wound balls enable the golfer to stop the ball very near its landing position.

To make wound golf balls, manufacturers use winding machines to stretch the elastic threads to various degrees of elongation during the winding process without subjecting the threads to unnecessary incidents of breakage. Generally, as the elongation and the winding tension increases, the compression and initial velocity of the ball increases. Thus, a more resilient wound ball is produced, which is desirable.

For wound golf balls, the thread is typically formed by a calendar and slitting method rather than an extrusion method. The calendared thread typically has a rectangular cross-section, while extruded thread generally has a circular cross-section.

Prior art wound golf balls and cores typically use polyisoprene rubber thread wound onto the cores at elongations of between 500 to 1000%. The amount of thread required for a golf ball core is dependent on the elastic modulus of the thread in the elongated state. Elongated polyisoprene thread generally has an elastic modulus of 10,000 psi to 20,000 psi. Further, the properties, in particular resilience, of the wound ball or core are dependent on how well the thread packs during winding. The dimensions of the thread and winding pattern control the packing density. Present art polyisoprene threads are typically at least $\frac{1}{16}$ inches wide by 0.02 inches thick, measured prior to winding. Present art polyisoprene thread, however, is commonly produced in thicknesses between 0.014 inches and 0.024.

U.S. Pat. No. 6,149,535 discloses a thread for winding having at least about 10 individual strands that are each at most about 0.01 inches in diameter. Preferably, the thread has more than 25 strands with diameters of less than about 0.002 inches. The smaller thread dimension allows the thread to be wound more densely. Preferably, the elastic modulus of the thread is greater than 20 ksi when wound about a center. Preferably, the maximum elongation of the thread is greater than about 8%.

A variety of golf balls have been designed by manufacturers to provide a wide range of playing characteristics, such as compression, velocity, "feel," and spin. In addition to ionomers, one of the most common polymers employed is polybutadiene and, more specifically, polybutadiene having a high cis-isomer concentration.

The use of a polybutadiene having a high cis-concentration results in a very resilient golf ball. These highly resilient golf balls have a relatively hard "feel" when struck by a club. Soft "feel" golf balls constructed with a high cis-polybutadiene may also be constructed, however, they tend to have low resilience. In an effort to provide improved golf balls, various other polybutadiene formulations have been prepared, as discussed below.

The most common polymers used by manufacturers to modify the properties of golf ball layers and/or covers have been ionomers, such as SURLYN, commercially available from E. I. DuPont de Nemours and Co., of Wilmington, Del. Recently, however, manufacturers have investigated the used of alternative polymers, such as polyurethane. For example, U.S. Pat. No. 6,132,324 is directed to a method of making a golf ball having a polyurethane cover. This patent is hereby incorporated by reference.

Polyurethanes have been recognized as useful materials for golf ball covers since about 1960. Polyurethane compositions are the product of a reaction between a curing agent and a polyurethane prepolymer, which is itself a product formed by a reaction between a polyol and a diisocyanate. The curing agents used previously are typically diamines or glycols. A catalyst is often employed to promote the reaction between the curing agent and the polyurethane prepolymer.

Since 1960, various companies have investigated the usefulness of polyurethane as a golf ball cover material. U.S. Pat. No. 4,123,061 teaches a golf ball made from a polyurethane prepolymer of polyether and a curing agent, such as a trifunctional polyol, a tetrafunctional polyol, or a diamine. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol. The first commercially successful polyurethane covered golf ball was the Titleist® Professional® ball, first released in 1993.

Unlike SURLYN® or other ionomer-covered golf balls, polyurethane golf ball covers can be formulated to possess the softer "feel" of balata covered golf balls. Conventional golf ball covers made from polyurethane, however, have not fully matched SURLYN®-covered golf balls with respect to resilience or the rebound that is in part a function of the initial velocity of a golf ball after impact with a golf club.

U.S. Pat. No. 3,989,568 discloses a three-component system employing either one or two polyurethane prepolymers and one or two polyols or fast-reacting diamine curing agents. The reactants chosen for the system must have different rates of reactions within two or more competing reactions.

U.S. Pat. No. 4,123,061 discloses a golf ball made from a polyurethane prepolymer of polyether and a curing agent, such as a trifunctional polyol, a tetrafunctional polyol, or a fast-reacting diamine curing agent.

U.S. Pat. No. 5,334,673 discloses a golf ball cover made from a composition of a polyurethane prepolymer and a slow-reacting polyamine curing agent and/or a difunctional glycol. Resultant golf balls are found to have improved shear resistance and cut resistance compared to covers made from balata or SURLYN®.

U.S. Pat. No. 5,692,974 discloses methods of using cationic ionomers in golf ball cover compositions. Additionally, the patent relates to golf balls having covers and cores incorporating urethane ionomers. Improved resiliency and initial velocity are achieved by the addition of an alkylating agent such as t-butyl-chloride which induces ionic interactions in the polyurethane to produce cationic type ionomers.

International Patent Application WO 98/37929 discloses a composition for golf ball covers that comprises a blend of a diisocyanate/polyol prepolymer and a curing agent comprising a blend of a slow-reacting diamine and a fast-reacting diamine. Improved "feel", playability, and durability characteristics are exhibited.

It is thus desired to prepare wound golf balls having lower compression, i.e., a softer ball, while having the same or higher resilience than conventional wound balls. It is alternatively desired to obtain the same or lower compression while achieving greater resilience.

U.S. Pat. No. 5,885,172 discloses a stiff thermoplastic inner cover with a thin thermoset material formed from a reactive liquid material. The thermoset material is formed and reacts at a temperature below the melting point of the stiff thermoplastic layer and no flow of the inner cover to the surface of the ball occurs.

U.S. Pat. No. 6,126,559 discloses a small, soft core with a thermoplastic cover at least 0.142 inches thick, preferably at least 0.150 inches thick, and more preferably at least 0.157 inches thick, and hardnesses of at least 60 Shore D. The thick cover can be molded in one or more layers, each of which may have the same hardness.

U.S. Pat. No. 6,117,025 discloses a three layer golf ball where each layer has at least a 3 point difference in Shore D hardness measured on the ball. An intermediate layer that is softer than at least one other layer is required.

One commercially available golf ball has two layers having the same hardness and the inner layer is not pigmented. Both layers are formed from the same ionomer, each having a Shore D hardness of about 70.

U.S. Pat. No. 6,210,283 disclose a urethane outer cover with an ionomer inner cover.

SUMMARY OF THE INVENTION

The invention relates to a golf ball including a core, a cover disposed about the core, which includes an inner cover layer formed from a material including rubber, and an outer cover layer having a thickness of less than about 0.05 inches and including at least one castable reactive liquid material or polyurethane. In one embodiment, the core is solid and comprised of one or more layers. In one embodiment, the golf ball further includes a wound layer including at least one tensioned thread material disposed between the core and the cover, each thread having at least one strand.

In one embodiment, the inner cover material has a hardness substantially stiffer than the outer cover material. In another embodiment, the rubber includes a natural or synthetic polyisoprene material, a blend of two different types of polyisoprenes, or a blend of polyisoprene with at least one additional polymer, or mixtures thereof. Preferably, the at least one additional polymer includes styrene-butadiene rubber, a styrene reinforced resin and/or may include at least one density-modifying filler.

In an additional embodiment, the inner cover layer is vulcanized. In another embodiment, the inner cover layer has an outer surface that is treated by one or more of halogenation, chemical surface treatment, UV radiation, electron beam exposure, microwave radiation, coating, plasma, or corona discharge.

In still another embodiment, the outer cover layer includes at least one thermoplastic or thermoset polyurethane. In yet another embodiment, the outer diameter of the inner cover layer is at least about 1.6 inches and the outer cover layer has a thickness of less than about 0.04 inches.

In yet another embodiment, golf ball further includes a tensioned elastomer material disposed between the center and the cover to form a wound layer. Preferably, the polyisoprene layer is disposed between the outer cover and the wound layer.

In another embodiment, core is solid, polyutadiene based and formed of a center and an outer core layer that is stiffer than the center.

In an embodiment, the rubber layer has a thickness of about 0.01 to 0.03 inches. In an additional embodiment, the cover materials have a Shore D hardness of about 20 to 60 and rubber layer has a hardness of 50 to 70. Preferably, in this embodiment, the rubber layer material has a flexual modulus of at least 50,000 psi.

BRIEF DESCRIPTION OF THE DRAWINGS

Further features and advantages of the invention can be ascertained from the following detailed description that is provided in connection with the drawing(s) described below.

DEFINITIONS

The term "about," as used herein in connection with one or more numbers or numerical ranges, should be understood to refer to all such numbers, including all numbers in a range.

As used herein, substituted and unsubstituted "aryl" groups means a hydrocarbon ring bearing a system of conjugated double bonds, typically comprising 4n+2B ring electrons, where n is an integer. Examples of aryl groups include, but are not limited to phenyl, naphthyl, anisyl, tolyl, xylenyl and the like. According to the present invention, aryl also includes heteroaryl groups, e.g., pyrimidine or thiophene. These aryl groups may also be substituted with any number of a variety of functional groups. In addition to the functional groups described herein in connection with carbocyclic groups, functional groups on the aryl groups can include hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites; and a combination thereof.

As used herein, the term "Atti compression" and "compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. Compression values are dependent on the diameter of the article being measured. When the Atti Gauge is used to measure cores having a diameter of less than 1.680 inches, it should be understood that a metallic or other suitable shim is used to make the measured object 1.680 inches in diameter.

As used herein, substituted and unsubstituted "carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, "cis-to-trans catalyst" means any component or a combination thereof that will convert at least a portion of cis-polybutadiene isomer to trans-polybutadiene isomer at a given temperature. It should be understood that the combination of the cis-isomer, the trans-isomer, and any vinyl-isomer, measured at any given time, comprises 100 percent of the polybutadiene.

As used herein, the term "coefficient of restitution" ("COR") for golf balls is defined as the ratio of the rebound velocity to the inbound velocity when balls are fired into a rigid plate. The inbound velocity is understood to be 125 ft/s.

As used herein, the term "dynamic stiffness" is defined as load divided by the deflection for a 1.4-mm spherical radius penetration probe oscillating at 1 Hz with an amplitude of 100 $\mu$m. The probe dynamically penetrates the surface of a sample material. Material samples of spherical cores were prepared by sectioning out a 6-mm-thick layer along the equator of core to produce a disk 6 mm thick with one surface containing the geometric center of the core. By positioning the probe at any selected radial position on the disk, a dynamic stiffness measurement may be obtained. Accurate dynamic measurements may be made by keeping the material sample at a substantially uniform temperature. The dynamic stiffness was acquired using a Dynamic Mechanical Analyzer, Model DMA 2980 available from TA Instruments Corporation of New Castle, Del. The instrument setting for the DMA 2980 were 1-Hz frequency, 100-$\mu$m amplitude, 0.3-N static load, and auto strain of 105 percent.

The 1.4-mm spherical radius probe is available from TA Instruments as a penetration kit accessory to the DMA 2980. The DMA 2980 is equipped with a temperature-controlled chamber that enables testing at a wide variety of ambient temperatures.

The method and instrument utilized for measuring "dynamic stiffness" may also be used to measure loss tangent. Loss tangent is the ratio of loss modulus to storage modulus. Loss modulus is the portion of modulus which is out of phase with displacement and storage modulus is the portion of modulus which is in phase with displacement. The DMA 2980 automatically calculates and reports loss tangent.

As used herein, the term "fluid" includes a liquid, a paste, a gel, a gas, or any combination thereof.

As used herein, the terms "Group VIA component" or "Group VIA element" mean a component that includes a sulfur component, a selenium component, or a tellurium component, or a combination thereof.

As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

As used herein, the term "molecular weight" is defined as the absolute weight average molecular weight. The molecular weight is determined by the following method: approximately 20 mg of polymer is dissolved in 10 mL of tetrahydrofuran ("THF"), which may take a few days at room temperature depending on the polymer's molecular weight and distribution. One liter of THF is filtered and degassed before being placed in a high-performance liquid chromatography ("HPLC") reservoir. The flow rate of the HPLC is set to 1 mL/min through a Viscogel column. This non-shedding, mixed bed, column model $GMH_{HR}$-H, which has an ID of 7.8 mm and 300 mm long is available from Viscotek Corp. of Houston, Tex. The THF flow rate is set to 1 mL/min for at least one hour before sample analysis is begun or until stable detector baselines are achieved. During this purging of the column and detector, the internal temperature of the Viscotek TDA Model 300 triple detector should be set to 40° C. This detector is also available from Viscotek Corp. The three detectors (i.e., Refractive Index, Differential Pressure, and Light Scattering) and the column should be brought to thermal equilibrium, and the detectors should be purged and zeroed, to prepare the system for calibration according to the instructions provided with this equipment. A 100-$\mu$L aliquot of sample solution can then be injected into the equipment and the molecular weight of each sample can be calculated with the Viscotek's triple detector software. When the molecular weight of the polybutadiene material is measured, a dn/dc of 0.130 should always be used. It should be understood that this equipment and these methods provide the molecular weight numbers described and claimed herein, and that other equipment or methods will not necessarily provide equivalent values as used herein.

As used herein, the term "multilayer" means at least two layers and includes fluid or liquid center balls, wound balls, hollow-center balls, and balls with at least two intermediate layers and/or cover layers.

As used herein, the term "parts per hundred," also known as "phr," is defined as the number of parts by weight of a particular component present in a mixture, relative to 100 parts by weight of the total polymer component.

Mathematically, this can be expressed as the weight of an ingredient divided by the total weight of the polymer, multiplied by a factor of 100.

As used herein the term "resilience index" is defined as the difference in loss tangent (tan δ) measured at 10 cpm and 1000 cpm divided by 990 (the frequency span) multiplied by 100,000 (for normalization and unit convenience). The loss tangent is measured using an RPA 2000 manufactured by Alpha Technologies of Akron, Ohio. The RPA 2000 is set to sweep from 2.5 to 1000 cpm at a temperature of 100° C. using an arc of 0.5 degrees. An average of six loss tangent measurements were acquired at each frequency and the average is used in calculation of the resilience index. The computation of resilience index is as follows:

Resilience Index=100,000·[(loss tangent@10 cpm)–(loss tangent@1000 cpm)]/990

As used herein, the term "substantially free" means less than about 5 weight percent, preferably less than about 3 weight percent, more preferably less than about 1 weight percent, and most preferably less than about 0.01 weight percent.

As used herein, "flexural modulus" is measured by ASTM D6272-98, Procedure B, as modified, about two weeks after polymer formation. As used herein, the term "stiffness" refers to the flexural modulus.

As used herein, "hardness" refers to the hardness of the material forming the particular layer of the ball being discussed, as measured by ASTM D2240-00. Hardness does not refer to the hardness of the golf ball.

DETAILED DESCRIPTION OF THE PREFERRED EMBODIMENTS

The present invention is directed to a golf ball with high resilience, to provide greater distance off the tee while conforming to the USGA golf rules. Methods for measuring the resiliency of golf balls are well known by those of ordinary skill in the art. One method of measuring the resiliency of a ball at impact is to utilize an air cannon or other means of propelling a ball at velocities equivalent to those of a golf club head. The balls are fired at a massive rigid block, with the inbound and outbound velocities being measured. The velocity may be measured by the use of light screens, which measure the time required for the ball to travel a fixed distance. The fixed distance divided by the transit time is equivalent to the average velocity of the ball over the fixed distance. The ratio of the outbound velocity to the inbound velocity is commonly referred to as the coefficient of restitution ("COR"). The COR is a direct measure of the resilience of a golf ball at a particular inbound velocity. Since golf balls behave in a linear-viscoelastic fashion, inbound ball velocity is functionally equivalent to club swing speed. In one embodiment, the present invention seeks to maximize the COR for low swing speed players. These players swing the club at the ball with low swing speeds, and thus tend to obtain lower ball velocity after impact and less distance off the tee.

Figure 1:
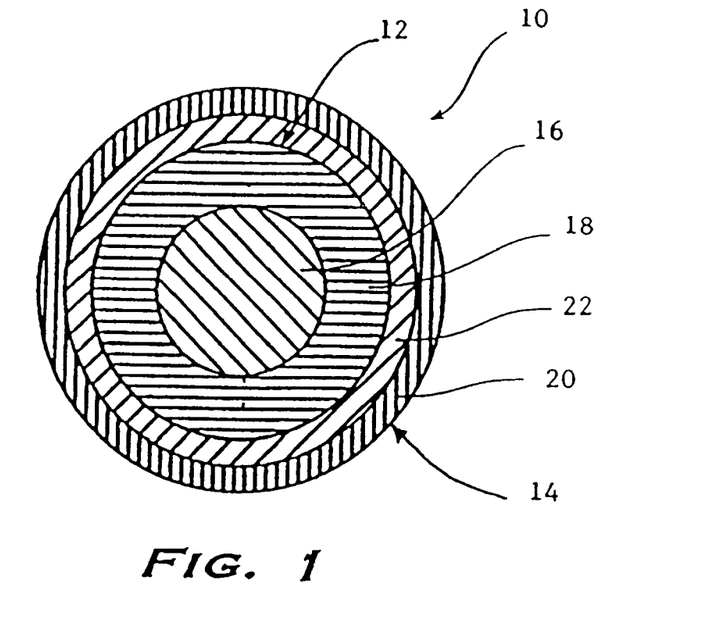
FIG. 1 is cross-sectional view of a first embodiment of a golf ball according to the present invention.

Referring to FIG. 1, the golf ball 10 can include any suitable material known in the art to form the core 12. In one embodiment, the golf ball 10 according to the present invention includes a core 12 of one or more layers 16 and 18 including a material formed from a polybutadiene material, or a reaction product thereof, having a molecular weight of greater than about 200,000 and a resilience index of at least about 40, a cover layer 20 including a polyurethane composition, or reaction product thereof, and polyisoprene layer 22 disposed between the core 12 and the cover 20.

Thus, improved golf balls can be prepared according to the invention by: (a) including a polybutadiene reaction product in the center, such that the polybutadiene reaction product has a molecular weight of greater than about 200,000 and a resilience index of at least about 40; (b) disposing a polyisoprene layer of about the center, optionally with one or more layers disposed there between; and (c) disposing a cover including at least one layer that includes a polyurethane material.

As shown in FIG. 1, the core 12 of the golf ball can be solid. The core could include a thermoset solid rubber sphere or a thermoplastic solid sphere. The core 12 can be comprised of a solid center 16 and a solid layer 18 being formed of thermoplastic and/or thermoset materials. Optionally, the center 16 is covered with a wound layer 18 and the cover according to the present invention.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan *, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked polybutadiene reaction product should be less than about 50,000 N/m at –50° C. Preferably, the dynamic stiffness should be from about 10,000 to 40,000 N/m at –50° C., more preferably, the dynamic stiffness should be from about 20,000 to 30,000 N/m at –50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is at least a portion of a golf ball core. The polybutadiene reaction product preferably has a loss tangent below about 0.1 at –50° C., and more preferably below about 0.07 at –50° C.

The center composition preferably includes at least one rubber material having a resilience index of at least about 40. Preferably, the resilience index is at least about 50. A comparison of a number of polybutadiene polymers are listed in Table 1 below. Polymers that produce resilient golf balls and, therefore, are suitable for use in the center or other portions of a golf ball according to the present invention include, but are not limited to, CB23, CB22, BR60, and 1207G. To clarify the method of computation for resilience index, the resilience index is measured at 100° C. CB23 is commercially available from Bayer Corporation of Akron, Ohio. For CB23, for example, the resilience index is computed as follows:

Resilience Index for CB23=100,000*[(0.954)−(0.407)]/990 Resilience Index for CB23=55

TABLE 1

Resilience Index of example polybutadiene ol ers

| Rubber | Tan δ at 10 cpm | Tan δ at 1000 cpm | Resilience Index at 100° C. |
|---|---|---|---|
| CB23 | 0.954 | 0.407 | 55 |
| CB22 | 0.895 | 0.358 | 54 |
| BR-60 | 0.749 | 0.350 | 40 |
| BR-40 | 0.841 | 0.446 | 40 |
| Taktene 8855 | 0.720 | 0.414 | 31 |
| CARIFLEX BR1220 | 0.487 | 0.439 | 5 |
| BUDENE 1207G | 0.825 | 0.388 | 44 |

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to those of ordinary skill in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures from about −20° C. to −50° C.

The golf ball core polybutadiene material typically has a hardness of at least about 15 Shore A, preferably from about 30 Shore A to 80 Shore D, more preferably from about 50 Shore A to 60 Shore D. In one preferred embodiment, the core 12 has a hardness of about 20 to 85 Shore C, preferably from about 40 to 80 Shore C, and more preferably from about 60 to 70 Shore C at the geometric center. The surface of the golf ball core is typically harder than at the geometric center. For example, a golf ball core, i.e., a sphere, having a hardness of 65 Shore C at its center might have a hardness of about 80 to 85 Shore C at its surface. The specific gravity is typically greater than about 0.7, preferably greater than about 1, for the golf ball polybutadiene material.

Additionally, the unvulcanized rubber, such as polybutadiene, in golf balls prepared according to the invention typically has a Mooney viscosity of about 40 to about 80, preferably from about 45 to about 60, and more preferably from about 45 to about 55. Mooney viscosity is typically measured according to ASTM D-1646-99.

At least one of the core center or outer layer includes a reaction product that includes a cis-to-trans catalyst, a resilient polymer component having polybutadiene, a free radical source, and optionally, a crosslinking agent, a filler, or both. Preferably, the polybutadiene reaction product is used to form at least a portion of the center of the golf ball, and further discussion below relates to this embodiment for preparing the center. Preferably, the reaction product has a first dynamic stiffness measured at −50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

Thus, the invention also includes a method to convert the cis-isomer of the polybutadiene resilient polymer component to the trans-isomer during a molding cycle and to form a golf ball. Various combinations of polymers, cis-to-trans catalysts, fillers, crosslinkers, and a source of free radicals, may be used. To obtain a higher resilience and lower compression center or intermediate layer, a high-molecular weight polybutadiene with a cis-isomer content preferably greater than about 90 percent is converted to increase the percentage of trans-isomer content at any point in the golf ball or portion thereof, preferably to increase the percentage throughout substantially all of the golf ball or portion thereof, during the molding cycle. More preferably, the cis-polybutadiene isomer is present in an amount of greater than about 95 percent of the total polybutadiene content. Without wishing to be bound by any particular theory, it is believed that a low amount of 1,2-polybutadiene isomer ("vinyl-polybutadiene") is desired in both the initial polybutadiene and the reaction product. Typically, the vinyl polybutadiene isomer content is less than about 7 percent. Preferably, the vinyl polybutadiene isomer content is less than about 4 percent. More preferably, the vinyl polybutadiene isomer content is less than about 2 percent. Without wishing to be bound by any particular theory, it is also believed that the resulting mobility of the combined cis- and trans-polybutadiene backbone is responsible for the lower modulus and higher resilience of the reaction product and golf balls including the same.

In one embodiment the coefficient of restitution of the golf ball at a club head speed of 160 ft/s is at least about 0.76 and the magnitude of the gradient of the coefficient of restitution to an inbound velocity is at least about 0.001 s/ft.

The invention also relates to a golf ball having at least a center including a polybutadiene having a molecular weight of greater than about 300,000 and a resilience index of at least about 40, having an outer diameter of at least about 1.51 inches, an inner cover layer surrounding the outer core layer, and an outer cover layer disposed around the inner cover layer, the outer cover layer including a polyurethane composition formed from a prepolymer having less than 7.5 percent by weight unreacted isocyanate groups and the inner cover comprising polyisoprene.

The invention also relates to a center including a polybutadiene having a molecular weight of greater than about 300,000 and a resilience index of at least about 40; a hoop stress layer surrounding the center, having an outer diameter of at least about 1.51 inches, and disposed between the center and the cover, wherein the hoop stress layer includes a glass, polyamide, aromatic polyamide, carbon, or metal fiber having a tensile strength of at least about 250,000 psi and a modulus of at least about 10,000,000 psi; and an inner cover comprised of polyisoprene disposed around the wound hoop stress layer, and an outer cover including a polyurethane composition.

To produce a polymer reaction product that exhibits the higher resilience and lower modulus (low compression) properties that are desirable and beneficial to golf ball playing characteristics, high-molecular-weight cis-1,4-polybutadiene, preferably may be converted to the trans-isomer during the molding cycle. "High-molecular weight" typically means that the polybutadiene material has a molecular weight average of greater than about 200,000. Preferably, the polybutadiene molecular weight is greater than about 250,000, more preferably from about 300,000 to 500,000. Without wishing to be bound by any particular theory, it is believed that the cis-to-trans catalyst component, in conjunction with the free radical source, acts to convert a percentage of the polybutadiene polymer component from the cis- to the trans-conformation. The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

In one embodiment, the at least one organosulfur component is substantially free of metal, which typically means less than about 10 weight percent metal, preferably less than about 3 weight percent metal, more preferably less than about 1 weight percent metal, and most preferably only trace amounts of metal, such as less than about 0.01 weight percent. In another embodiment, the organosulfur component is completely free of metal.

As used herein when referring to the invention, the term "organosulfur compound(s)" or "organosulfur component(s)," means at least one of 4,4'-diphenyl disulfide; 4,4'-ditolyl disulfide; 2,2'-benzamido diphenyl disulfide; bis (2-aminophenyl) disulfide; bis(4-aminophenyl) disulfide; bis(3-aminophenyl) disulfide; 2,2'-bis(4-aminonaphthyl) disulfide; 2,2'-bis(3-aminonaphthyl) disulfide; 2,2'-bis(4-aminonaphthyl) disulfide; 2,2'-bis(5-aminonaphthyl) disulfide; 2,2'-bis(6-aminonaphthyl) disulfide; 2,2'-bis(7-aminonaphthyl) disulfide; 2,2'-bis (8-aminonaphthyl) disulfide; 1,1'-bis(2-aminonaphthyl) disulfide; 1,1'-bis(3-aminonaphthyl) disulfide; 1,1'-bis(3-aminonaphthyl) disulfide; 1,1'-bis(4-aminonaphthyl) disulfide; 1,1'-bis (5-aminonaphthyl) disulfide; 1,1'-bis(6-aminonaphthyl) disulfide; 1,1'-bis(7-aminonaphthyl) disulfide; 1,1'-bis(8-aminonaphthyl) disulfide; 1,2'-diamino-1,2'-dithiodinaphthalene; 2,3'-diamino-1,2'-dithiodinaphthalene; bis(4-chlorophenyl) disulfide; bis(2-chlorophenyl) disulfide; bis(3-chlorophenyl) disulfide; bis(4-bromophenyl) disulfide; bis(2-bromophenyl) disulfide; bis(3-bromophenyl) disulfide; bis(4-fluorophenyl) disulfide; bis(4-iodophenyl) disulfide; bis (2,5-dichlorophenyl) disulfide; bis(3,5-dichlorophenyl) disulfide; bis (2,4-dichlorophenyl) disulfide; bis(2,6-dichlorophenyl) disulfide; bis(2,5-dibromophenyl) disulfide; bis(3,5-dibromophenyl) disulfide; bis(2-chloro-5-bromophenyl) disulfide; bis(2,4,6-trichlorophenyl) disulfide; bis(2,3,4,5,6-pentachlorophenyl) disulfide; bis(4-cyanophenyl) disulfide; bis(2-cyanophenyl) disulfide; bis(4-nitrophenyl) disulfide; bis(2-nitrophenyl) disulfide; 2,2'-dithiobenzoic acid ethylester; 2,2'-dithiobenzoic acid methylester; 2,2'-dithiobenzoic acid; 4,4'-dithiobenzoic acid ethylester; bis(4-acetylphenyl) disulfide; bis(2-acetylphenyl) disulfide; bis(4-formylphenyl) disulfide; bis(4-carbamoylphenyl) disulfide; 1,1'-dinaphthyl disulfide; 2,2'-dinaphthyl disulfide; 1,2'-dinaphthyl disulfide; 2,2'-bis (1-chlorodinaphthyl) disulfide; 2,2'-bis(1-bromonaphthyl) disulfide; 1,1'-bis(2-chloronaphthyl) disulfide; 2,2'-bis(1-cyanonaphthyl) disulfide; 2,2'-bis (1-acetylnaphthyl) disulfide; and the like; or a mixture thereof. Preferred organosulfur components include 4,4'-diphenyl disulfide, 4,4'-ditolyl disulfide, or 2,2'-benzamido diphenyl disulfide, or a mixture thereof. A more preferred organosulfur component includes 4,4'-ditolyl disulfide. The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof.

Suitable substituted or unsubstituted aromatic organic components that do not include sulfur or a metal include, but are not limited to, 4,4'-diphenyl acetylene, azobenzene, or a mixture thereof. The aromatic organic group preferably ranges in size from $C_6$ to $C_{20}$, and more preferably from $C_6$ to $C_{10}$. Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth.

A substituted or unsubstituted aromatic organic compound may also be included in the cis-to-trans catalyst. Suitable substituted or unsubstituted aromatic organic components include, but are not limited to, components having the formula $(R_1)_x$-$R_3$-M-$R_4$-$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium. In one embodiment, the aromatic organic compound is substantially free of metal, while in another embodiment the aromatic organic compound is completely free of metal.

The cis-to-trans catalyst can also include a Group VIA component. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt. The cis-to-trans catalyst is typically present in an amount from about 0.1 to 10 parts per hundred of the total resilient polymer component. Preferably, the cis-to-trans catalyst is present in an amount from about 0.1 to 8 parts per hundred of the total resilient polymer component. More preferably, the cis-to-trans catalyst is present in an amount from about 0.1 to 5 parts per hundred of the total resilient polymer component. The cis-to-trans catalyst is typically present in an amount sufficient to produce the reaction product so as to increase the trans-polybutadiene isomer content to contain from about 5 percent to 70 percent trans-polybutadiene based on the total resilient polymer component.

The measurement of trans-isomer content of polybutadiene referred to herein was and can be accomplished as follows. Calibration standards are prepared using at least two polybutadiene rubber samples of known trans-content, e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a commercially available Fourier Transform Infrared ("FTIR") spectrometer equipped with a Photoacoustic ("PAS") cell, a PAS spectrum of each standard was obtained using the following instrument parameters: scan at speed of 2.5 KHz (0.16 cm/s optical velocity), use a 1.2 KHz electronic filter, set an undersampling ratio of 2 (number of laser signal zero crossings before collecting a sample), co-add a minimum of 128 scans at a resolution of 4 $cm^{-1}$ over a range of 375 to 4000 $cm^{-1}$ with a sensitivity setting of 1.

The cis-, trans-, and vinyl-polybutadiene peaks are typically found between 600 and 1100 $cm^{-1}$ in the PAS spectrum. The area under each of the trans-polybutadiene peaks can be integrated. Determining the fraction of each peak area relative to the total area of the three isomer peaks allow construction of a calibration curve of the trans-polybutadiene area fraction versus the actual trans-polybutadiene content. The correlation coefficient ($R^2$) of the resulting calibration curve must be a minimum of 0.95.

A PAS spectrum is obtained, using the parameters described above, for the unknown core material at the point of interest (e.g., the surface or center of the core) by filling the PAS cell with a sample containing a freshly cut, uncontaminated surface free of foreign matters, such as mold release and the like. The trans-polybutadiene area fraction of the unknown is analyzed to determine the actual trans-isomer content from the calibration curve.

In one known circumstance when barium sulfate is included, the above method for testing trans-content may be less accurate. Thus, an additional or alternative test of the trans-content of polybutadiene is as follows. Calibration standards are prepared using at least two polybutadienes of known trans-content (e.g., high and low percent trans-polybutadiene). These samples are used alone and blended together in such a way as to create a ladder of trans-polybutadiene content of at least about 1.5% to 50% or to bracket the unknown amount, such that the resulting calibration curve contains at least about 13 equally spaced points.

Using a Fourier Transform Raman ("FT-Raman") spectrometer equipped with a near-infrared laser, a Stokes Raman spectrum should be obtained from each standard using the following instrument parameters: sufficient laser power to obtain a good signal-to-noise ratio ("S/N") without causing excessive heating or fluorescence (typically about 400 to 800 mW is suitable); a resolution of 2 $cm^{-1}$; over a Raman shift spectral range of about 400 to 4000 $cm^{-1}$; and co-adding at least 300 scans.

A calibration curve may be constructed from the data generated above, using a chemometrics approach and software such as PLSplus/IQ from Galactic Industries Corp. of Salem, N.H. An acceptable calibration was obtained with this software using a PLS-1 curve generated using an SNV (detrend) pathlength correction, a mean center data preparation, and a 5-point SG second derivative over the spectral range from about 1600 to 1700 $cm^{-1}$. The correlation coefficient ($R^2$) of the resulting calibration curve must be a minimum of 0.95.

A Raman spectrum of the core material is obtained using this instrument at the point of interest in the sample (e.g., surface or center of the golf ball core). The sample must be free of foreign matter, such as mold release, etc. Analyze the spectrum of the sample using the PLS calibration curve to determine trans-polybutadiene isomer content of the sample.

A free-radical source, often alternatively referred to as a free-radical initiator, is required in the composition and method. The free-radical source is typically a peroxide, and preferably an organic peroxide. Suitable free-radical sources include di-t-amyl peroxide, di(2-t-butyl-peroxyisopropyl) benzene peroxide, 3,3,5-trimethyl cyclohexane, a-a bis (t-butylperoxy) diisopropylbenzene, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis (t-butylperoxy)valerate, lauryl peroxide, benzoyl peroxide, t-butyl hydroperoxide, and the like, and any mixture thereof. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. It should be understood by those of ordinary skill in the art that the presence of certain cis-to-trans catalysts according to the invention may require a larger amount of free-radical source, such as the amounts described herein, compared to conventional cross-linking reactions. The initiator(s) at 100% activity are preferably added in an amount ranging from about 0.05 phr to 5 phr based upon 100 parts of polybutadiene. More preferably, the amount of initiator added ranges from about 0.15 phr to 4 phr, and most preferably from about 0.25 phr to 3 phr. The free radical source may alternatively or additionally be one or more of an electron beam, UV or gamma radiation, x-rays, or any other high energy radiation source capable of generating free radicals. It should be further understood that heat often facilitates initiation of the generation of free radicals.

A crosslinking agent is included to increase the hardness of the reaction product. Suitable crosslinking agents include one or more metallic salts of unsaturated fatty acids or monocarboxylic acids, such as zinc, aluminum, sodium, lithium, nickel, calcium, or magnesium acrylate salts, and the like, and mixtures thereof. Preferred acrylates include zinc acrylate, zinc diacrylate, zinc methacrylate, and zinc dimethacrylate, and mixtures thereof. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the resilient polymer component, preferably from about 10 to 40 percent of the resilient polymer component, more preferably from about 10 to 30 percent of the resilient polymer component. When an organosulfur is selected as the cis-to-trans catalyst, zinc diacrylate may be selected as the crosslinking agent and is preferably present in an amount of less than about 25 phr. Suitable, commercially available, zinc diacrylates include those from the Sartomer Corporation.

The compositions of the present invention may also include fillers, added to the polybutadiene material to adjust the density and/or specific gravity of the core or to the cover. As used herein, the term "fillers" includes any compound or composition that can be used to adjust the density and/or other properties of the subject golf ball core. Fillers useful in the golf ball core according to the present invention include, for example, zinc oxide, barium sulfate, flakes, fibers, and regrind, which is ground, recycled core material (for example, ground to about 30 mesh particle size). The amount and type of filler utilized is governed by the amount and weight of other ingredients in the composition, since a maximum golf ball weight of 45.93 g (1.62 ounces) has been established by the United States Golf Association (USGA). Appropriate fillers generally used have a specific gravity from about 2 to 20. In one preferred embodiment, the specific gravity can be about 2 to 6. In one embodiment, the center material can have a specific gravity of about 1 to 5, preferably about 1.1 to 2.

Fillers are typically polymeric or mineral particles. Exemplary fillers include precipitated hydrated silica; clay; talc; asbestos; glass fibers; aramid fibers; mica; calcium metasilicate; barium sulfate; zinc sulfide; lithopone; silicates; silicon carbide; diatomaceous earth; polyvinyl chloride; carbonates such as calcium carbonate and magnesium carbonate; metals such as titanium, tungsten, aluminum, bismuth, nickel, molybdenum, iron, lead, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, cellulose flock, and leather fiber; micro balloons such as glass and ceramic; fly ash; and combinations thereof.

Antioxidants may also optionally be included in the polybutadiene material in the centers produced according to the present invention. Antioxidants are compounds that can inhibit or prevent the oxidative degradation of the polybutadiene. Antioxidants useful in the present invention include, but are not limited to, dihydroquinoline antioxidants, amine type antioxidants, and phenolic type antioxidants.

Other optional ingredients, such as accelerators, e.g., tetramethylthiuram, peptizers, processing aids, processing oils, plasticizers, dyes and pigments, as well as other additives well known to those of ordinary skill in the art may also be used in the present invention in amounts sufficient to achieve the purpose for which they are typically used.

The polymers, free-radical initiator, filler(s), and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The crosslinking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-trans catalyst, filler, zinc diacrylate, and peroxide are added sequentially. Suitable mixing equipment is well known to those of ordinary skill in the art, and such equipment may include a Banbury mixer, a two-roll mill, or a twin screw extruder. Conventional mixing speeds are typically used, although the speed must be high enough to impart substantially uniform dispersion of the constituents. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the polymer component. Also, too high a mixing speed may undesirably result in creation of enough heat to initiate the crosslinking before the preforms are shaped and assembled around a core. The mixing temperature depends upon the type of polymer components, and more importantly, on the type of free-radical initiator. For example, when using di(2-t-butyl-peroxyisopropyl) benzene as the free-radical initiator, a mixing temperature of about 80° C. to 125° C., preferably about 88° C. to 110° C., and more preferably about 90° C. to 100° C., is suitable to safely mix the ingredients. Additionally, it is important to maintain a mixing temperature below the peroxide decomposition temperature. For example, if dicumyl peroxide is selected as the peroxide, the temperature should not exceed 200° F. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which may initiate the cis-to-trans conversion and crosslinking simultaneously. The temperature and duration of the molding cycle can be readily selected based upon the type of peroxide and cis-trans catalyst selected. The molding cycle may have a single step of molding the mixture at a single temperature for a fixed time duration. An example of a single step molding cycle, for a mixture that contains dicumyl peroxide, would hold the polymer mixture at 335° F. for a duration of 11 minutes at about 2,500 psi. The molding cycle may also include a two-step process, in which the polymer mixture is held in the mold at an initial temperature for an initial duration of time, followed by holding at a second, typically higher temperature for a second duration of time. An example of a two-step molding cycle would be holding the mold at 290° F. for 40 minutes, then ramping the mold to 340° F. where it is held for a duration of 20 minutes. In a preferred embodiment of the current invention, a single-step cure cycle is employed. Single-step processes are effective and efficient, reducing the time and cost of a two-step process. The resilient polymer component, polybutadiene, cis-to-trans conversion catalyst, additional polymers, free-radical initiator, filler, and any other materials used in forming either the golf ball center or any portion of the core, in accordance with the invention, may be combined to form a golf ball by an injection molding process, which is also well-known to one of ordinary skill in the art. Although the curing time depends on the various materials selected, a particularly suitable curing time is about 5 to 18 minutes, preferably from about 8 to 15 minutes, and more preferably from about 10 to 12 minutes. Those of ordinary skill in the art will be readily able to adjust the curing time upward or downward based on the particular materials used and the discussion herein.

The cured resilient polymer component, which contains a greater amount of trans-polybutadiene than the uncured resilient polymer component, is formed into an article having a first hardness at a point in the interior and a surface having a second hardness such that the second hardness differs from the first hardness by greater than 10 percent of the first hardness. Preferably, the article is a sphere and the point is the midpoint of the article. In another embodiment, the second hardness differs from the first by greater than 20 percent of the first hardness. The cured article also has a first amount of trans-polybutadiene at an interior location and a second amount of trans-polybutadiene at a surface location, wherein the first amount is at least about 6 percent less than the second amount, preferably at least about 10 percent less than the second amount, and more preferably at least about 20 percent less than the second amount. The interior location is preferably a midpoint and the article is preferably a sphere.

The compression of the core, or portion of the core, of golf balls prepared according to the invention is typically from about 15 to 100. In one embodiment, the compression is below about 50, more preferably below about 25. In a preferred embodiment, the compression is from about 60 to 90, more preferably from about 70 to 85. Various equivalent methods of measuring compression exist. For example, a 70 Atti compression (also previously referred to as the "PGA Compression") is equivalent to a center hardness of 3.2 mm deflection under a 100 kg load and a "spring constant" of 36 Kgf/mm. In one embodiment, the golf ball core has a deflection of about 3.3 mm to 7 mm under a 130 kg—10 kg test.

In one embodiment, the core is comprised of a center and an outer layer. The center has an outer diameter of at least about 0.5 inches, preferably from about 0.75 inches to 1.5 inches. In one preferred embodiment, the center has an outer diameter of about 0.8 to 1.2 inches.

In another embodiment, the center includes a material formed from a conversion reaction of polybutadiene having a first amount of trans-isomer, a free radical source, and at least one cis-to-trans catalyst. In a preferred embodiment, the reaction occurs at a temperature and for a time sufficient to form a polybutadiene reaction product having a second amount of trans-isomer greater than the first amount of trans-isomer. In one embodiment, the cis-to-trans catalyst includes at least one of an organosulfur compound, an inorganic sulfur compound, an aromatic organometallic compound, a metal-organosulfur compound, tellurium, selenium, elemental sulfur, a polymeric sulfur, or an aromatic organic compound. Preferably, the catalyst includes an organosulfur component, and in one preferred embodiment the catalyst includes at least one of 4,4'-diphenyl disulfide, 4,4'-ditolyl disulfide, or 2,2'-benzamido diphenyl disulfide, or a combination thereof. The cis-to-trans catalyst is typically present in an amount from about 0.1 to 10 parts per hundred of polybutadiene.

Preferably, the core 12 has an outer diameter $D_1$ of at least about 1 inches, more preferably about 1.3 to 1.6 inches. In one embodiment, the outer diameter of the core is about 1.4 inches to 1.58 inches. As stated above, the outer layer may be formed of windings of at least one thread 30. In this case, the center diameter is preferably at least 1.4 inches. Thus, the amount of thread used tends to be small in comparison with the size of the core. The wound layer can lower compression and result in a ball having a softer feel. Also, the wound layer can be very stiff and increase the hardness of the ball. In one embodiment, the thickness of the wound layer is less than about 0.3 inches. In one preferred embodiment, the thickness of the wound layer is less than about 0.1 inches. In this preferred embodiment, it is preferred that the thread material include polyether urea or a very hard, high-tensile-modulus thread. "Hard, high-tensile-modulus" should be understood herein to mean a tensile modulus of at least about 10,000,000 psi.

Thread materials including polyisoprene, polyether urea, polyester, polyethylene, polypropylene, or combinations thereof may be used with the present invention. Relatively high and low modulus threads may be wound simultaneously around a center. Moreover, in another embodiment, a thread that "softens" during a subsequent process of the compression and/or injection molding of the cover process, creating an intermediate layer or a fused layer, such as polyether urea could be used. Also, a thread that does not exhibit softening during molding, such as polyisoprene, may be used with the present invention. In one embodiment, it is preferred to use thread including polyether urea in the wound layer.

Threads used in the present invention may be formed using a variety of processes including conventional calendering and slitting. Furthermore, processes such as melt spinning, wet spinning, dry spinning or polymerization spinning may also be used to provide threads. Melt spinning is a highly economic process. Polymers are extruded through spinnerets by a heated spin pump. The resulting fibers are drawn off at rates up to 1200 m/min. The fibers are drawn and allowed to solidify and cool in the air. Because of the high temperatures required, only melting and thermally stable polymers can be melt spun. These polymers include poly(olefins), aliphatic polyamides, and aromatic polyesters, all of which are suitable thread materials.

For polymers that decompose on melting, the wet spinning method is used. Solutions of about 5 to 20% are passed through the spinnerets by a spin pump. A precipitation bath is used to coagulate the filaments and a drawing or stretching bath is used to draw the filaments. Filament production rates under this method are lower than melt spinning, typically about 50 to 100 m/min. Because of solvent recovery costs, this method is less economical.

In dry spinning, air is the coagulating bath. The method is usable for polymers that decompose on melting, however only when readily volatile solvents are known for the polymers. Solutions of about 20 to 55% are used. After leaving spinneret orifices, resulting filaments enter a chamber having a length of about 5 to 8 m. In the chamber, jets of warm air are directed toward the filaments. This causes the solvent to evaporate and the filaments to solidify. The process has higher rates of spinning than the wet spinning process. Typically, filament production rates are about 300 to 500 m/min. The initial capital investment of equipment is higher, but the operation costs are lower than in wet spinning. Further, this process is only usable for spinning polymers for which readily volatile solvents are known.

In another method of spinning, polymerization spinning, a monomer is polymerized together with initiators, fillers, pigments, and flame retardants, or other selected additives. The polymerizate is directly spun at rates of about 400 m/min. The polymerizate is not isolated. Only rapidly polymerizing monomers are suitable for this method. For example, LYCRA® is produced by polymerization spinning.

In general, the single-ply golf ball thread is formed by mixing synthetic cis-polyisoprene rubber, natural rubber and a curing system together, calendering this mixture into a sheet, curing the sheet, and slitting the sheet into threads. The thread is generally rectangular and its dimensions are preferably 0.0625×0.02 inches. The typical area of the thread 300 is $a_1$, which is generally about 0.0013 in$^2$. This material can be applied in a very thin layer over the center.

Another type of thread usable in the present invention is comprised of many individual filaments or strands. Preferably over 10 strands make up the thread and more preferably over 50 strands form the thread. Most preferably, the thread contains greater than 100 strands. The strands have a small diameter, typically of a diameter of less than about 0.002 inches, and more preferably less than about 0.0001 inches. Preferably, the strands of the present invention have a cross-sectional area $a_2$ of less than about 0.0001 in$^2$ and most preferably less than about 0.00001 in$^2$. Preferably, the thread of this embodiment has a cross-sectional area $a_3$ of less than about 0.001 in$^2$ and most preferably less than about 0.0005 in$^2$. Threads formed of multiple strands can be prepared according to the invention by reference to U.S. Pat. No. 6,149,535, the disclosure of which is hereby incorporated herein by express reference thereto.

Preferably, the thread has an elongation to break of greater than about 8%. More preferably, the thread has an elongation to break of greater than about 25%. A minimum of about 8% thread elongation prior to breakage allows the golf ball to deform during impact. A golf ball where the thread deforms significantly less than about 8% during a typical driver impact will feel hard when struck and will have undesirable spin and feel characteristics. In one embodiment, the thread has an elongation to break of about 200% to 1000%. Preferably, the elastic modulus of the thread in the wound state is greater than about 10,000 psi. In one preferred embodiment, the elastic modulus is greater than about 20,000 psi. In another preferred embodiment, the elastic modulus is greater than about 25,000 psi.

The strands of the thread may be held together with a binder or they may be spun together. Melt spinning, wet spinning, dry spinning, and polymerization spinning may be used to produce the threads. Each method has been discussed in more detail herein.

The thread preferably includes a polymeric material. Suitable polymers include polyether urea, such as LYCRA®; polyester urea; polyester block copolymers, such as HYTREL®; isotactic-poly(propylene); polyethylene; polyamide; poly(oxymethylene); polyketone; poly(ethylene terephthalate), such as DACRON®; poly(p-phenylene terephthalamide), such as KEVLAR®; poly(acrylonitrile), such as ORLON®; trans,trans-diaminodicyclohexylmethane and dodecanedicarboxylic acid, such as QUINA®, LYCRA®, HYTREL®, DACRON®, KEVLAR®, ORLON®, and QUINA® are available from E. I. DuPont de Nemours & Co. of Wilmington, Del. Glass fiber and, for example, S-GLASS® from Corning Corporation can also be used. Also, D7 Globe thread by Globe Manufacturing of Fall River, Mass. can be used. Indeed, a mixture of any of the thread materials discussed herein can be included in a thread layer of the invention.

The thread may also be comprised of strands having different physical properties to achieve desired stretch and elongation characteristics. For example, the thread may include strands of a first elastic type of material that is weak but resilient and also strands of a second elastic type of material that is stronger but less resilient. In another example, the thread may include at least one strand of polyisoprene rubber thread having a diameter of less than about 0.02 inches. This strand may be surrounded by about 10 to 50 polyether urea strands each having a diameter of less than about 0.002 inches.

In another embodiment, the golf ball can include a wound hoop-stress layer, either alternatively or in addition to a wound layer as described above. The wound layer is formed of high tensile fiber wound about the inner core and preferably in contact with the inner core. A variety of high tensile modulus fibers may provide the requisite hoop stress in a minimally thick layer, preferably glass, Dacron, polyamide, aromatic polyamide (such as DuPont's Kevlar aramid fiber), carbon, or metal fibers. Metals, such as steel (particularly stainless steel), monel metal, or titanium are preferred. A hoop layer created from metal fiber may have an increased moment of inertia, and thus can rotate at a slower speed when struck with a golf club and can thus retain its rotational velocity longer during flight.

The strength of these high tensile elastic modulus fibers is preferably high to accommodate the extremely high stresses placed upon the golf ball windings when struck with a golf club. It can be varied, however, to provide a golf ball with a good feel and durability. A tensile strength of at least about 250,000 psi is preferred, however, a tensile strength of at least about 500,000 psi is more preferred. The tensile elastic modulus of the high tensile elastic modulus fiber along with its gauge or thickness may also be varied to provide a stiffer, a softer, or a more durable ball as desired. A modulus of at least about 10,000,000 psi is preferred. A modulus of at least about 20,000,000 psi is most preferred. The hoop layer is preferably wound to a thickness of about 0.01 to 0.10 inches. In one hoop layer embodiment, an initial strain of at least 100% is preferred on the tensioned material. Preferably the hoop stress layer has an inner diameter of at least 1.50 inches and an outer diameter of preferably 1.58–1.62 inches.

In the hoop layer embodiment, the high tensile elastic modulus fiber that is used to form the wound layer may have an initial tension applied to the fiber during the winding process, preferably of less than about 4% strain. An initial strain of less than about 10% is more preferred. An initial strain of less than about 25% is most preferred. The fiber itself is preferably continuous for ease of winding about the core.

The golf balls 10 of FIGS. 1 may be made by any conventional process employed in the golf ball art. For example, the golf ball can be manufactured by injection or compression molding the solid center 16. For the multi-layer core, another layer 16 can then be injection or compression molded over the center. In the wound embodiment, the thread is then wound about the solid center to form the wound layer 16 as previously described. The cover layers 14 can then be injection or compression molded reaction injection molded or cast about the layer 16 by processes which are well known in the art.

A golf ball of the present invention can also be formed by initially forming a shell by compression molding hemispherical cups, the cups are bonded together to form the shell to create a cavity and filling the cavity with fluid or liquid to form a fluid filled center. In one embodiment, the shell is covered by a solid layer. In another embodiment, a thread can then be wound directly around the shell to form the wound layer as previously described if there are no additional layers desired between the center and wound layer; otherwise, the intermediate layer(s) are formed around the shell before the tensioned material is disposed about the center layers. The cover can then be disposed about the wound layer.

Properties that are desirable for the cover are good moldability, high abrasion resistance, high tear strength, high resilience, and good mold release, among others. The cover typically has a thickness to provide sufficient strength, good performance characteristics and durability. The cover preferably has a thickness of less than about 0.1 inches, more preferably, less than about 0.05 inches, and most preferably, from about 0.01 to about 0.04 inches. In another embodiment, the outer cover layer is less than 0.02 inches and preferably less than 0.01 inches. The invention is particularly directed towards a multilayer golf ball that includes a core, an inner cover layer, and an outer cover layer. In this embodiment, preferably, both the inner and outer cover layers has a thickness of less than about 0.05 inches, more preferably the thickness of each cover layer is from about 0.02 to about 0.04 inches.

In the embodiment with an inner and outer cover layers, the inner cover layer can be prepared as follows. Although injection or compression molding, or casting, can be used, in one preferred embodiment the inner cover is formed over the core by using compression molding. A suitable speed for increasing the pressure to close the molds around the cores can be readily determined. Thus, a time on the order of greater than 1 second to about 30 seconds, preferably 2 seconds to 20 seconds may be suitable depending on other process conditions and the materials involved. In one preferred embodiment, a time of about 10–15 seconds is most suitable for closing the mold. It should be understood that this time is measured from when each half of the mold is in contact with the polyisoprene material there between and relates to the time over which the pressure on the molds and centers is increased to fully close the molds. This method advantageously helps inhibit or avoid weld lines that can occur using injection molding methods.

The inner cover may be made of any natural or synthetic balata material, i.e., trans-polyisoprene, blends of balata with other materials, or similar materials that may be molded about a core. In one embodiment, compression molding is used to form the inner cover layer. In one embodiment, the inner cover may also contain styrene-butadiene rubber ("SBR") or SBR reinforced resin, for example, available as PLIOLITE® from Goodyear Tire & Rubber Co. of Akron, Ohio as a stiffener, and one or more fillers to adjust the specific gravity. Suitable fillers include those described herein. Preferred fillers are those that have a small particle size and high specific gravity, such as tungsten. To increase the moment of inertia the weight of the inner cover should be increased as much as possible. The inner cover may, but is not required to be, vulcanized as it is applied to the wound core, or in a post molding step. The outer surface of the inner cover layer may be treated prior to application of the outer cover, by one or more of halogenation, chemical surface modification or treatment, UV radiation, electron beam exposure, microwave radiation, coating (via spray, dip, or electrostatic application), plasma, or corona discharge, as described in co-pending U.S. patent application Ser. No. 09/389,058, which is incorporated herein by express reference thereto. Preferably, the treatment will increase adhesion of the inner cover layer to the outer cover. The treatment may be used to activate a material compounded into the base material which will have the same preferred interaction with the outer cover to facilitate, for example, adhesion. The treatment may further be used to activate a material such that the softening point of the base material is increased, improving the temperature stability of the final product. The inner cover layer provides stiffness to the wound core.

For a ball having a diameter of 1.68 inches, the outer diameter of the inner cover layer is preferably from about 1.55 inches to 1.67 inches. In one embodiment, the outer diameter is from about 1.6 inches to 1.64 inches. An exemplary inner cover layer outer diameter is 1.62 inches. In another embodiment, the outer diameter is between 1.66 and 1.67 inches. The inner cover layer preferably has a thickness of about 0.01 inches to 0.1 inches, preferably about 0.02 inches to 0.05 inches. In one preferred embodiment, the thickness of the inner cover layer is about 0.03 inches to 0.04 inches. In another embodiment, the inner cover is between 0.05 and 0.09 inches. In one preferred embodiment, the inner cover layer has a hardness of about 20 to 80 Shore D, preferably about 50 to 75 Shore D, and more preferably about 52 to 64 Shore D when measured on the core. A slab of the material will have a slightly lower hardness. The compression of the core and inner cover layer is typically from about 20 to 100, preferably from about 30 to 75. In one preferred embodiment, the core and inner cover layer compression is from about 40 to 70. In one embodiment, the inner cover layer has a specific gravity of about 0.8 to 1.3, preferably about 0.9 to 1.2. In one embodiment, the weight of the partly formed golf ball including inner cover layer is about 40 g to 46 g, preferably about 40 to 42 g. The loss tangent of the inner cover layer can, in one embodiment, be from about 0.03 to 0.08 from a temperature of about −30° C. to 20° C. The elasticity and complex modulus of the inner cover layer can be from about 5,000 to 12,000 Kgf/cm$^2$ over a temperature of about −30° C. to 20° C. The following table lists preferred inner cover materials and their properties.

| Blend | Shore D | JIS C | Tensile (kpsi) | Flex (kpsi) | Melt Flow |
|---|---|---|---|---|---|
| 100[1] | 47 | 78 | 26 | 44 | 0.41 |
| 90/10 | 50 | 80 | 33 | 50 | 0.41 |
| 75/25 | 53 | 85 | 41 | 74 | 0.53 |
| 60/40 | 56 | 87 | 63 | 108 | |
| 50/50 | 59 | 91 | 136 | 139[3] | 0.56 |
| 1.0 SG[2] w/Barytes | 50 | 82 | | 57 | |
| 1.1 SG w/Barytes | 52 | 83 | | 62 | |
| 1.2 SG w/Barytes | 51 | 83 | 40 | 63 | |
| 1.3 SG w/Barytes | 52 | 85 | 43 | 69 | |
| 1.0 SG w/Tungsten | 50 | 82 | 37 | 56 | |
| 1.1 SG w/Tungsten | 49 | 82 | 36 | 55 | |
| 1.2 SG w/Tungsten | 50 | 83 | 39 | 56 | |
| 1.3 SG w/Tungsten | 50 | 83 | 40 | 60 | |

[1]The Blend Ratios are made with Balata/Pliolite.
[2]The blends with the SG change are made with the 90 Balata/10 Pliolite blend.
[3]The 50/50 flex bars all failed during testing.

The golf ball polyisoprene material of the present invention preferably has a flexural modulus of from about 500 psi to 300,000 psi, preferably from about 50,000 to 150,000 psi and most preferably, between about 60,000 psi and 140,000 psi.

The cover layer, or outer cover layer, can include any materials known to those of ordinary skill in the art, including thermoplastic and thermosetting materials, but preferably the cover layer can include any suitable materials, such as:

(1) Polyurethanes, such as those prepared from polyols and diisocyanates or polyisocyanates and those disclosed in U.S. Pat. No. 5,334,673; and (2) Polyureas, such as those disclosed in U.S. Pat. No. 5,484,870.

The cover preferably includes a polyurethane composition comprising the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, i.e., as part of a prepolymer and in the curing agent. The polyurethane composition may be used in forming the inner cover, outer cover, or both. In one preferred embodiment, the outer cover includes the polyurethane composition.

In a different preferred embodiment, the curing agent includes a polyol curing agent. In a more preferred embodiment, the polyol curing agent includes ethylene glycol; diethylene glycol; polyethylene glycol; propylene glycol; polypropylene glycol; lower molecular weight poly-tetramethylene ether glycol; 1,3-bis(2-hydroxyethoxy) benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(B-hydroxyethyl) ether; hydroquinone-di-(B-hydroxyethyl) ether; trimethylol propane, or mixtures thereof.

In one embodiment, the polyurethane composition includes at least one isocyanate and at least one curing agent. In yet another embodiment, the polyurethane composition includes at least one isocyanate, at least one polyol, and at least one curing agent. In a preferred embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. In another preferred embodiment, the at least one polyol includes a polyether polyol, hydroxy-terminated polybutadiene, polyester polyol, polycaprolactone polyol, polycarbonate polyol, or mixtures thereof. In yet another preferred embodiment, the curing agent includes a polyamine curing agent, a polyol curing agent, or a mixture thereof. In a more preferred embodiment, the curing agent includes a polyamine curing agent. In a most preferred embodiment, the polyamine curing agent includes 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); or mixtures thereof.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, more preferably, from about 2.5% to about 7.5%, and most preferably, from about 4% to about 6.5%.

Any polyol available to one of ordinary skill in the art is suitable for use according to the invention. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol, polybutylene adipate glycol, polyethylene propylene adipate glycol, orthophthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy] ethoxy}benzene; 1,4-butanediol; 1,5-pentanediol; 1,6-hexanediol; resorcinol-di-(4-hydroxyethyl) ether; hydroquinone-di-(4-hydroxyethyl) ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

An optional filler component may be chosen to impart additional density to blends of the previously described components. The selection of the filler component is dependent upon the characteristics of the golf ball desired. Examples of fillers for use in the filler component of the polyurethane include those described herein for the polybutadiene reaction component. Similar or identical additives, such as nanoparticles, fibers, glass spheres, and/or various metals, such as titanium and tungsten, can be added to the polyurethane compositions of the present invention, as well, in amounts as needed to modify one or more golf ball properties. Additional components that can be added to the polyurethane composition include UV stabilizers and other dyes, as well as optical brighteners and fluorescent pigments and dyes. Such additional ingredients may be added in any amounts that will achieve their desired purpose.

Due to the very thin nature, it has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the inner core using a variety of application techniques such as spraying, dipping, spin coating, or flow coating methods which are well known in the art. An example of a suitable coating technique is that which is disclosed in U.S. Pat. No. 5,733,428, filed May 2, 1995 entitled "Method And Apparatus For Forming Polyurethane Cover On A Golf Ball," the disclosure of which is hereby incorporated herein in its entirety by express reference thereto.

The cover, or the outer cover if both inner and outer cover layers are present, is preferably formed around the core by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urethane mix for introducing cores into the mold halves is determined to be approximately from about 2,000 cP to about 30,000 cP, with the preferred range of about 8,000 cP to about 15,000 cP.

To start the cover formation, mixing of the prepolymer and curative can be accomplished in motorized mixer including mixing head by feeding through lines metered amounts of curative and prepolymer. Top preheated mold halves are filled and placed in fixture units using pins moving into holes in each mold. After the reacting materials have resided in top mold halves for about 10 to about 80 seconds, a core is lowered at a controlled speed into the gelling reacting mixture. At a later time, a bottom mold half or a series of bottom mold halves have similar mixture amounts introduced into the cavity.

A ball cup can hold the ball core through reduced pressure (or partial vacuum) in hose. Upon location of the coated core in the halves of the mold after gelling for about 10 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. The disclosures of each patent is hereby expressly incorporated herein by express reference thereto. The method of the invention, however, is not limited to the use of these techniques.

In one embodiment, the cover typically has a loss tangent of 0.16 to 0.075 from −30° C. to 20° C. In one embodiment, the complex modulus of the cover layer on the ball is from about 1000 to 2800 Kgf/cm$^2$ from −30° C. to 20° C. In one embodiment, the specific gravity of the cover material is from about 1 to 2, preferably from about 1.1 to 1.4. In one preferred embodiment, the cover material has a specific gravity of about 1.15 to 1.25.

When golf balls are prepared according to the invention, they typically will have dimple coverage greater than about 60 percent, preferably greater than about 65 percent, and more preferably greater than about 75 percent. The flexural modulus of the cover on the golf balls is typically greater than about 500 psi, and is preferably from about 500 psi to 80,000 psi.

As discussed herein, the outer cover layer is preferably formed from a relatively soft polyurethane material. In particular, the material of the outer cover layer should have a material hardness, as measured by ASTM D2240-00, from about 20 to about 60 Shore D, preferably from about 30 to about 50 Shore D. In one embodiment, the material hardness of the outer cover material is about 45 Shore D. When the hardness of the outer cover material is measured directly on the golf ball, the values tend to be higher than then the material hardness. In one embodiment, the outer cover hardness, as measured on the golf ball, is from about 45 to about 60 Shore D. The inner cover layer, preferably has a material hardness of about 50 to about 70 Shore D, more preferably from about 60 to about 65 Shore D. In an alternative embodiment, the inner cover layer has a hardness, when measured on the golf ball, of about 45 to about 64 Shore D.

The resultant golf balls typically have a coefficient of restitution of greater than about 0.7, preferably greater than about 0.75, and more preferably greater than about 0.78. The golf balls also typically have an Atti compression (which has been referred to as PGA compression in the past) of at least about 40, preferably from about 50 to 120, and more preferably from about 60 to 100.

EXAMPLES

These and other aspects of the present invention may be more fully understood with reference to the following examples, which are merely illustrative of the preferred embodiments of the present invention golf ball construction. The examples are not to be construed as limiting the invention.

Example 1

Cores For Three-Piece Solid Balls

A variety of single piece cores were prepared according to the present invention, as well as some cores prepared using conventional materials. All cores in Table 2 were prepared to a diameter of 1.58 inches. The recipes for each core, and values measured for compression are presented in Table 2 below:

TABLE 2

Golf Ball Core Properties from Various Rubber Formulations

| Ingredients | Mooney viscosity @ 100° C. | Ex. 1 | Ex. 2 | Ex. 3 | Ex. 4 | Ex. 5 |
|---|---|---|---|---|---|---|
| CB23 | 51 | 100 | | | | |
| CB22 | 63 | | 100 | | | |
| BR-60 | 60 | | | 100 | | |
| Taktene 8855 | 48 | | | | 100 | |
| CARIFLEX BR1220 | 43 | | | | | 100 |
| zinc diacrylate (phr) | | 28 | 28 | 28 | 28 | 28 |
| peroxide (phr) | | 0.53 | 0.53 | 0.53 | 0.53 | 0.53 |
| zinc oxide (phr) | | 4.3 | 4.3 | 4.3 | 4.3 | 4.3 |
| tungsten (phr) | | 11 | 11 | 11 | 11 | 11 |
| Core Properties | | | | | | |
| compression | | 77 | 75 | 77 | 76 | 71 |

A variety of metal sulfide cis-to-trans catalysts that successfully converted a portion of the cis-polybutadiene isomer to the trans-isomer are presented in Table 3. CARIFLEX BR1220 polybutadiene (100 phr) was reacted with zinc oxide (5 phr), dicumyl peroxide (3 phr, the free radical initiator), and zinc diacrylate (25 phr), to form a reaction product according to the present invention.

TABLE 3

Metal Sulfide Conversion Examples

| CARIFLEX BR 1220 | 100 | 100 | 100 | 100 | 100 | 100 | 100 | 100 | 100 | 100 | 100 | 100 | 100 |
|---|---|---|---|---|---|---|---|---|---|---|---|---|---|
| Zinc oxide | 5 | 5 | 5 | 5 | 5 | 5 | 5 | 5 | 5 | 5 | 5 | 5 | 5 |
| Dicumyl peroxide | 3 | 3 | 3 | 3 | 3 | 3 | 3 | 3 | 3 | 3 | 3 | 3 | 3 |
| Zinc Diacrylate | 25 | 25 | 25 | 25 | 25 | 25 | 25 | 25 | 25 | 25 | 25 | 25 | 25 |
| Cis-to-Trans "Catalyst" | | | | | | | | | | | | | |
| FeS | 2.87 | | | | | | | | | | | | |
| MnS | | 2.65 | | | | | | | | | | | |
| $TiS_2$ | | | 1.70 | | | | | | | | | | |
| CaS | | | | 2.20 | | | | | | | | | |
| CoS | | | | | 2.77 | | | | | | | | |
| $MoS_2$ | | | | | | 2.43 | | | | | | | |
| $WS_2$ | | | | | | | 3.77 | | | | | | |
| $Cu_2S$ | | | | | | | | 4.65 | | | | | |
| $SeS_2$ | | | | | | | | | 2.19 | | | | |
| $Y_2S_3$ | | | | | | | | | | 2.76 | | | |
| ZnS | | | | | | | | | | | 2.97 | | |
| $Sb_2S_3$ | | | | | | | | | | | | 3.45 | |
| $Bi_2S_3$ | | | | | | | | | | | | | 5.22 |
| % Trans BR isomer Precure | 1.5 | 1.5 | 1.5 | 1.5 | 1.5 | 1.5 | 1.5 | 1.5 | 1.5 | 1.5 | 1.5 | 1.5 | 1.5 |
| % Trans BR isomer Postcure | 10.5 | 16.1 | 17.0 | 8.3 | 10.3 | 10.1 | 9.2 | 5.8 | 5.2 | 10.2 | 10.1 | 10.7 | 10.5 |

Trans-isomer conversion percentages range from below 8 percent to above 17 percent for the various catalysts that are present in amounts ranging from below 1.7 phr to above 3.7 phr. The table clearly demonstrates the effectiveness of numerous different cis-to-trans catalysts, at varying concentrations, for increasing the trans-polybutadiene content.

Example 2

Cores Employing an Organosulfur Cis-to-Trans Catalyst

A core was created according to the present invention employing an organosulfur compound as the cis-to-trans conversion catalyst. The resultant core properties clearly demonstrate the advantages of a golf ball core made according to the current invention, as compared to example cores constructed with conventional technology. The components and physical characteristics are presented in Table 4.

The compressive load of a core prepared according to the invention is approximately half of the compressive load of cores constructed in accordance with U.S. Pat. Nos. 5,697,856, 5,252,652, and 4,692,497, while at the same time having roughly the same, and in some cases higher, COR (resilience). The core made according to the current invention have a lower compressive load (soft), yet are resilient (fast). The compressive load is greater than that of a core constructed in accordance with U.S. Pat. No. 3,239,228, but has a significantly higher COR. The core of U.S. Pat. No. 3,239,228 is very soft and very slow (very low COR).

The percent change in dynamic stiffness from 0° C. to −50° C. was also measured at both the edge and center of the core. The dynamic stiffness at both the edge and the center of the core of the current invention varied only slightly, less than 20 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-isomer conversion was also measured at both the center and edge of the core prepared according to the current invention, and for cores prepared as disclosed in the same four patents mentioned above, allowing a trans-gradient to be calculated. The core according to the current invention had a trans-gradient of about 32 percent from edge to center. For the core prepared according to the current invention, the pre-and post-cure trans-percentages were also measured to determine the effectiveness of that process. The percentage of polybutadiene converted to the trans-isomer ranged from almost 40 percent at the center to greater than 55 percent at the edge. Two of the cores prepared according to conventional technology, U.S. Pat. Nos. 3,239,228 and 4,692,497, had a zero trans-gradient. A third core, prepared according to U.S. Pat. No. 5,697,856, had only a slight trans-gradient, less than 18 percent from edge to center. A fourth core, prepared according to U.S. Pat. No. 5,252,652, had a very large gradient, almost 65 percent from edge to center.

TABLE 4

| | | | | Examples of Conventional Golf Balls | | | |
|---|---|---|---|---|---|---|---|
| | Invention Examples | | | U.S. Pat. | U.S. Pat. No. 5816944 U.S. Pat. | U.S. Pat. | U.S. Pat. No. 4971329 U.S. Pat. |
| | #1 | #2 | #3 | No. 3239228 | No. 5697856 | No. 5252652 | No. 4692497 |
| Chemical Constituents | | | | | | | |
| Polybutadiene (Shell, CARIFLEX BR1220) | 100 | 100 | 100 | | N/A | N/A | N/A |
| Polybutadiene (Firestone, 35 NF) | | | | 100 | N/A | N/A | N/A |

TABLE 4-continued

|  | Invention Examples | | | U.S. Pat. No. 3239228 | Examples of Conventional Golf Balls | | |
|---|---|---|---|---|---|---|---|
|  | | | | | U.S. Pat. No. 5816944 U.S. Pat. No. 5697856 | U.S. Pat. No. 5252652 | U.S. Pat. No. 4971329 U.S. Pat. No. 4692497 |
|  | #1 | #2 | #3 | | | | |
| DMDS |  |  |  | 2.1 | N/A | N/A | N/A |
| Carbon Black (RA) |  |  |  | 15 | N/A | N/A | N/A |
| Wood Flour |  |  |  | 24 | N/A | N/A | N/A |
| Sulfur |  |  |  | 24 | N/A | N/A | N/A |
| Stearic Acid |  |  |  | 1.5 | N/A | N/A | N/A |
| Reogen |  |  |  | 15 | N/A | N/A | N/A |
| Vanox MBPC |  |  |  | 2 | N/A | N/A | N/A |
| Triethanolamine |  |  |  | 4 | N/A | N/A | N/A |
| Zinc oxide | 5 | 5 | 5 | 5 | N/A | N/A | N/A |
| Dicumyl peroxide | 3 | 1.9 | 2 |  | N/A | N/A | N/A |
| Zinc Diacrylate | 25 | 25 | 25 |  | N/A | N/A | N/A |
| Cis-Trans "Catalyst" |  |  |  |  | N/A | N/A | N/A |
| MnS |  | 0.82 |  |  | N/A | N/A | N/A |
| Ditolyldisulfide | 2.5 |  | 1.5 |  | N/A | N/A | N/A |
| $Cu_2S$ |  |  | 1 | N/A |  | N/A | N/A |
| Resultant Core Properties | | | | | | | |
| Load (lbs) @ 10.8% Deflection 1.580" core | 165.5 | 191.4 | 191.8 | 61.1 | 325 | 390 | 480 |
| Coefficient of Restitution @ 125 ft/s | 0.783 | 0.777 | 0.785 | 0.599 | 0.779 | 0.805 | 0.775 |
| Hardness Shore C | | | | | | | |
| Surface | 61 | 76 | 62 | 35 | 75 | 80 | 80.5 |
| Center | 52 | 52 | 59 | 30 | 70 | 61 | 66.5 |
| Dynamic Stiffness @ 0° C. (N/m) | | | | | | | |
| Edge* | 25338 | 27676 | 28493 | 8312 | 62757 | 83032 | 72235 |
| Center | 20783 | 17390 | 27579 | 8361 | 61071 | 26264 | 50612 |
| Dynamic Stiffness @ −50° C. (N/m) | | | | | | | |
| Edge* | 30265 | 34523 | 34455 | 19394 | 92763 | 109053 | 108242 |
| Center | 23022 | 20603 | 32195 | 18617 | 89677 | 28808 | 83183 |
| Dynamic Stiffness Ratio at −50° C./0° C. | | | | | | | |
| Edge* | 119% | 125% | 121% | 233% | 148% | 131% | 150% |
| Center | 111% | 118% | 117% | 223% | 147% | 110% | 164% |
| Loss Tangent 0° C. | | | | | | | |
| Edge* | 0.024 | 0.027 | 0.024 | 0.074 | 0.039 | 0.037 | 0.045 |
| Center | 0.025 | 0.023 | 0.023 | 0.073 | 0.033 | 0.025 | 0.043 |
| Loss Tangent −50° C. | | | | | | | |
| Edge* | 0.098 | 0.084 | 0.097 | 0.183 | 0.142 | 0.119 | 0.099 |
| Center | 0.067 | 0.071 | 0.085 | 0.180 | 0.129 | 0.059 | 0.095 |
| % Trans BR isomer Precure | 1.5 | 1.5 | 1.5 | 50 | N/A | N/A | N/A |
| % Trans BR isomer Postcure | | | | | | | |
| Surface | 55.8 | 8.4 | 45.5 | 50 | 30.2 | 24.6 | 1.5 |
| Center | 37.8 | 4.6 | 25.5 | 50 | 24.7 | 8.5 | 1.5 |
| % Trans Variation (Surf. − Center)/Surf. | 32% | 45% | 44% | 0% | 18% | 65% | 0% |

*Edge is measured approximately 5 mm from the exterior surface of the measured article.

Example 3

Cores, Employing an Inorganic Sulfide Cis-to-Trans Catalyst

A core according to the present invention was created employing an inorganic sulfide compound as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load is approximately half of the compressive load of three cores constructed in accordance with U.S. Pat. Nos. 5,697,856, 5,252,652, and 4,692,497, while at the same time retaining roughly the same, and in some cases, a higher COR (resilience). The core made according to the current invention is soft, yet resilient (fast). The compressive load is greater than a core constructed in accordance with U.S. Pat. No. 3,239,228, but has a significantly higher COR. The core of U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of the core of the current invention varied only slightly, less than 125 percent, over the temperature range investigated. The core made according to U.S. Pat. No. 3,239,228 varied over 230 percent, whereas the cores made according to other conventional technology, had a dynamic stiffness that varied by greater than 130 percent, and typically by as much as 150 percent, over the same temperature range.

The percent of trans-conversion was also measured at both the center and edge of the core prepared according to the current invention, and for cores prepared according to the same four patents mentioned above, allowing a trans-gradient to be calculated. The core according to the current invention had a trans-gradient of about 45 percent from edge to center. Two of the cores prepared in accordance with U.S. Pat. Nos. 3,239,228 and 4,692,497 had a zero trans-gradient. A third core, prepared in accordance with U.S. Pat. No. 5,697,856, had only a slight trans-gradient, less than 18 percent from edge to center. A fourth core, prepared in accordance with U.S. Pat. No. 5,252,652, had a very large gradient, almost 65 percent, from edge to center.

Example 4

Core Employing a Blend of Organosulfur and Inorganic Sulfide Cis-to-trans Catalyst A core according to the present invention was created employing a blend of organosulfur and inorganic sulfide compounds as the cis-to-trans conversion catalyst. The resultant core properties clearly demonstrate the advantages of a golf ball core made according to the current invention as compared to example cores constructed with conventional technology. The components and physical characteristics are presented in Table 4.

The compressive load is approximately half of the compressive load of three cores constructed in accordance with U.S. Pat. Nos. 5,697,856, 5,252,652, and 4,692,497, while at the same time retaining roughly the same, and in some cases a higher COR (resilience). The core made according to the current invention is soft, yet resilient (fast). The compressive load of the invention is greater than a fourth core constructed in accordance with U.S. Pat. No. 3,239,228, but has a significantly higher COR. The core constructed in accordance with U.S. Pat. No. 3,239,228 is very soft and very slow (low COR).

The percent change in dynamic stiffness from 0° C. to −50° C. was also measured at both the edge and center of the cores. The dynamic stiffness at both the edge and the center of the core of the current invention varied only slightly, less than 121 percent, over the temperature range investigated. The core made in accordance with U.S. Pat. No. 3,239,228 varied over 230 percent, whereas the cores made according to other conventional technology had a dynamic stiffness that varied by greater than 130 percent, and typically by as much as 150 percent, over the same temperature range.

The percent of trans-conversion was also measured at both the center and edge of the core prepared according to the current invention, and for cores prepared to the same four patents mentioned above, allowing a trans-gradient to be calculated. The core according to the current invention had a trans-gradient that about 44 percent from edge to center. For the core prepared according to the current invention, the pre- and post-cure trans-percentages was also measured to determine the effectiveness of that process. The percentage of polybutadiene converted to the trans-isomer ranged from almost 26 percent at the center to greater than 45 percent at the edge. Two of the cores prepared in accordance with U.S. Pat. Nos. 3,239,228 and 4,692,497 had a zero trans-gradient. A third core prepared in accordance with U.S. Pat. No. 5,697,856 had only a slight trans-gradient, less than 18 percent from edge to center. A fourth core, prepared in accordance with U.S. Pat. No. 5,252,652 had a very large gradient, almost 65 percent from edge to center.

Example 5

Wound Ball Prepared According to the Invention

A dual core golf ball according to the present invention can be prepared having a solid center, an intermediate layer of a tensioned material surrounding the solid center, and a multilayer cover disposed concentrically around the intermediate layer. The components and physical characteristics are presented below in Table 5.

TABLE 5

| Center Composition | Ingredients (ph) |
| --- | --- |
| CARIFLEX BR1220 | 100 |
| zinc diacrylate | 20 |
| dicumyl peroxide | 2.5 |
| zinc oxide | 39 |
| DTDS | 0.75 |
| Center Properties | |
| % trans Precure | 1.5 |
| % trans Postcure | 40 |
| load in lbs required (10.8% deflection) | 109 |
| Wound Layer Composition | |
| Cis-Polyisoprene thread | 100 |
| Inner Cover Composition and Properties | |
| TP 251 (Trans-Polyisoprene) | 60 |
| PLIOLITE | 40 |
| Shore D hardness | 56 |
| thickness | 0.03in |
| Outer Cover Composition and Properties | |
| MDI polyurethane | |
| thickness | 0.03in |

The center can be created from CARIFLEX BR-1220 polybutadiene as the starting material, the only difference being replacing the VAROX 802-40KE-HP peroxide (a good scorch resistant peroxide with technology) with a DTDS cis-to-trans catalyst of the current invention and dicumyl peroxide. This substitution allows a portion of the polybutadiene material to be converted to the trans-configuration during the molding process. The resulting solid center can have an outside diameter of approximately 1.15 inches. The polybutadiene reaction product prepared thereby had a trans-isomer content of 40 percent compared to the 1.5 percent trans-isomer of conventional balls. An intermediate layer, having outside diameter of approximately 1.56 inches, can be constructed by winding a thread material under tension around the solid center to form a wound core. The tensioned material includes conventional cis-polyisoprene thread.

Example 6

Solid Ball Prepared According to the Invention

An exemplary ball can be prepared using polybutadiene rubber having about 40–50 Mooney viscosity, a DTDS cis-to-trans catalyst, 20–35 phr zinc diacrylate, and a tungsten filler to adjust the density of the center. The core can be about 1.5–1.6 inches in diameter. The core compression is desirably about 50–60 and has a deflection of greater than about 3.0 mm under the 130 kg–10 kg test.

An inner cover comprised of trans-polyisoprene can be compression molded over the core. The inner cover can have a hardness of about 45–64 Shore D and the inner cover is desirably formed to a thickness of about 0.02–0.05 inches.

Preferably, a stiff trans-polyisoprene from Kuraray is used. The trans-polyisoprene can also be mixed with a styrene-butadiene rubber and/or styrene reinforced resin such as Pliolite for a stiffer compound. Preferably, the SBR or the like is between 0 and 50% of the inner cover compound.

The outer cover can be formed of an MDI based cast urethane material having a cured hardness of about 45–60 Shore D when measured on the ball. The cover preferably has a thickness of about 0.01 to 0.03 inches. The urethane can be prepared from 1 equivalent of MDI/PTMEG polyol 2000 prepolymer having 6.0% NCO, 0.95 equivalent of Ethacure 300, and 3.5% HCC-19584 (a white color dispersion). ETHACURE 300 is commercially available from Albermarle Corporation. Conventional paints or other color stabilization packages may be applied over the cover of the golf ball. A suitable dimple pattern is a 392 dual dimple icosahedron pattern having a dimple volume of about 590 mm$^3$.

Example 7

Polyether Urea Wound Golf Balls

According to the invention, a ball can have a 1.40–1.55 inch core having a compression of about 40–80 before the winding is applied. A wound layer of a polyetherurea thread material having an outer diameter of the wound layer of 1.55–1.60 inches can be applied and then covered with two layers of cover material using the same cover materials set forth above.

While it is apparent that the illustrative embodiments of the invention herein disclosed fulfills the objectives stated above, it will be appreciated that numerous modifications and other embodiments may be devised by those of ordinary skill in the art. For example, the present invention could use more than one thread where the threads are chemically, physically or mechanically distinct from each other. Therefore, it will be understood that the appended claims are intended to cover all such modifications and embodiments which come within the spirit and scope of the present invention.

What is claimed is:

1. A golf ball comprising:
   a core;
   a cover disposed about the core, comprising:
      a solid inner cover layer formed from a material comprising polyisoprene; and
      an outer cover layer having a thickness of less than about 0.05 inches and comprising at least one castable reactive liquid material or a reaction product thereof or a polyurethane.

2. The golf ball of claim 1, further comprising a wound layer comprising at least one tensioned thread material disposed between the core and the cover, each thread having at least one strand.

3. The golf ball of claim 1, wherein the polyisoprene comprises a cis-polyisoprene or trans-polyisoprene material, a blend of two different types of polyisoprene, or a blend of polyisoprene with at least one additional polymer, or mixtures thereof.

4. The golf ball of claim 3, wherein the at least one additional polymer comprises styrene-butadiene rubber.

5. The golf ball of claim 4, wherein the inner cover layer further comprises at least one density-modifying filler.

6. The golf ball of claim 1, wherein the inner cover layer is comprised of vulcanized trans-polyisoprene.

7. The golf ball of claim 1, wherein the inner cover layer has an outer surface that is treated by one or more of halogenation, chemical surface treatment, UV radiation, electron beam exposure, microwave radiation, coating, plasma, or corona discharge.

8. The golf ball of claim 1, wherein the outer cover layer comprises at least one polyurethane.

9. The golf ball of claim 1, wherein the outer diameter of the inner cover layer is at least about 1.6 inches and the outer cover layer has a thickness of less than about 0.35 inches.

10. The golf ball of claim 1, wherein the inner cover layer has a hardness of about 45 to 64 Shore D when measured on the surface of the inner cover layer.

11. The golf ball of claim 1, wherein the outer cover layer has a hardness of about 45 to about 60 Shore D when measured on the ball.

12. The golf ball of claim 1, wherein the inner cover thickness is between about 0.02 and 0.05 inches.

13. The golf ball of claim 1, wherein the inner cover layer further comprises less than about 50% styrene-butadiene rubber.

14. The golf ball of claim 1, wherein the inner cover layer has a flexural modulus of at least about 50,000 psi.

15. A golf ball comprising:
   a core;
   a cover disposed about the core, comprising:
      an inner cover layer formed from a material comprising polyisoprene and at least styrene-butadiene rubber or styrene reinforced resin; and
      an outer cover layer comprising at least one castable reactive liquid material or a reaction product thereof, or a polyurethane.

16. The golf ball of claim 15, wherein the inner cover layer is vulcanized.

17. The golf ball of claim 15, wherein the outer diameter of the inner cover layer is at least about 1.6 inches and the outer cover layer has a thickness of less than about 0.35 inches.

18. The golf ball of claim 15, wherein the inner cover layer has a hardness of about 45 to 64 Shore D when measured on the surface of the inner cover layer.

* * * * *